Figure 1:
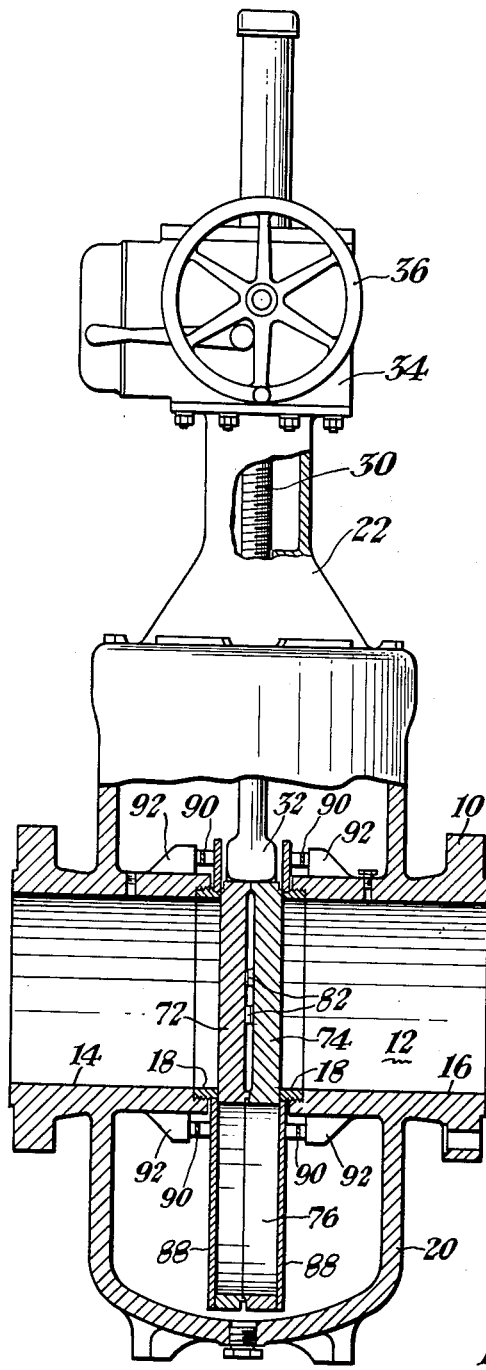

Dec. 27, 1955    N. O. SMITH-PETERSEN ET AL    2,728,349
VALVES
Filed Aug. 9, 1950    3 Sheets-Sheet 1

INVENTORS
Nils O. Smith-Petersen
and Frederick J. Krummel.
BY
Albert J. Henderson
THEIR ATTORNEY INVENTORS
Nils O. Smith-Petersen
and Frederick J. Krummel.
BY
THEIR ATTORNEY Dec. 27, 1955   N. O. SMITH-PETERSEN ET AL   2,728,349
VALVES
Filed Aug. 9, 1950   3 Sheets-Sheet 3

INVENTORS
Nils O. Smith-Petersen
and Frederick J. Krummel.
BY
Albert J. Henderson
THEIR ATTORNEY

United States Patent Office 2,728,349
Patented Dec. 27, 1955

2,728,349
VALVES

Nils O. Smith-Petersen, Yonkers, N. Y., and Frederick J. Krummel, East St. Louis, Ill., assignors to Walworth Company, Boston, Mass., a corporation of Massachusetts Application August 9, 1950, Serial No. 178,422

7 Claims. (Cl. 137—242)

This invention relates to valves and more particularly to conduit gate valves.

Valves of the described nature have heretofore been subject to various disadvantages including a tendency to lock the closure member between the valve seats in the closed position. Necessarily, a wedging action is required to spread the disc elements of the closure member apart and achieve tight seating, but this action should not interfere with normal operation with the valve to open position. These valve discs are often constructed with inner inclined surfaces which slide relatively to each other when the movement of one disc upwardly or downwardly is arrested by stop so located as to produce a wedging action when a closure member is in open or closed position. However, the fluid pressure may cause a friction force on the down-stream side between one disc and its seat of sufficient magnitude to arrest the movement of that disc. A wedging action thereby occurs and forces both discs against the seats in a position intermediate the normal opened or closed positions with a tendency toward locking the discs in such position.

Attempts to overcome this locking tendency have produced the so-called one-way valve. Thus, if the valve is given a definite or preferred position with regard to flow direction of the fluid then the tendency toward locking is diminished. However, the direction of the fluid flow can not then be reversed without increasing the locking tendency so that the use of the valve is limited to operations where no reversal of fluid flow occurs. Springs and other devices are used to keep the discs away from the seats in intermediate valve positions, but the fluid pressure often overcomes such devices. Moreover, such spacing of the discs and seats permits foreign and abrasive substances to lodge in the contact areas with disastrous consequences to the desired tight sealing conditions.

Another objectionable feature of the inclined disc faces is that the wedge angle becomes small due to the length of the discs. The locking effect of small wedge angles is well-known and may be sufficient to render the valve inoperative. The long surfaces are difficult to make precise without expensive operations. If not precise then only spot contact will occur leading to surface galling and possible seizure between the parts.

The valves should not be limited for use only in horizontal or substantially horizontal pipe lines. In existing conduit valves this limitation is imposed due to the nature of the wedging areas. Thus, if such valves are used in vertical or almost vertical pipe lines then the weight of the discs will alter the action of the forces on the wedge surfaces and the wedge action itself. This leads to further locking difficulties as will be apparent.

The present invention seeks to overcome the difficulties heretofore apparent in conduit gate valves by providing a generally improved construction without complicated parts or involved assembly operations. A pair of guide members are permanently mounted on opposite sides of the valve casing intermediate the seating means. Wedging means are carried by each guide member and located axially of the flow passages. Expansible spreader means are positioned in the guide members for operative engagement with the valve discs at all times. The valve discs are movable relative to the guides and spreader means between open and closed positions and carry wedging means for cooperation with the wedging means on the guide members in the closed position and serving to move the discs laterally into seating engagement with the seating means. The valve discs also carry longitudinal ribs which slidably engage the spreader means during movement of the valve discs between open and closed positions for maintaining the valve discs in yieldable engagement with the seating means during such movement. Shielding means are yieldably mounted on the casing for operative engagement with the valve discs and extend beyond the lowest position of the disc ports.

An object of the invention is to prevent any possibility of any wedging action on the discs except when the valve is fully closed.

Another object of the invention is to eliminate the possibility of wedging action on the discs in other than one direction of the disc motion.

Another object of the invention is to remove the wedging action forces from the closure areas of the discs thereby lessening the total force effect upon such areas.

Another object of the invention is to make the wedging action take place opposite the seat rings in the valve body.

Another object of the invention is to locate the source of the wedging action in the disc guides.

Another object of the invention is to eliminate traveling of both of the cooperating wedge surfaces.

Another object of the invention is to incorporate in the guides sufficient stationary and permanent forces by springs or otherwise to press the discs against the seat rings thereby insuring full disc-to-seat ring contact at all times and in all positions of the valve including locations of the valve in vertical and inclined pipe lines.

Another object of the invention is to further protect the disc and seat ring contact areas by the use of shields projecting beyond the contact area and held against the discs by stationary and permanent forces due to spring action or otherwise.

Another object of this invention is to make such forces acting on the shields of lesser magnitude than the forces pressing the discs against the seat rings and only sufficient to protect the disc and seat ring contact surfaces against deposits of foreign matter.

Another object of the invention is to prevent sediment in the disc port openings when closing the valve from being discharged into the bottom of the valve body by having the shields extended beyond the lowest position of such port openings.

Figure 2:
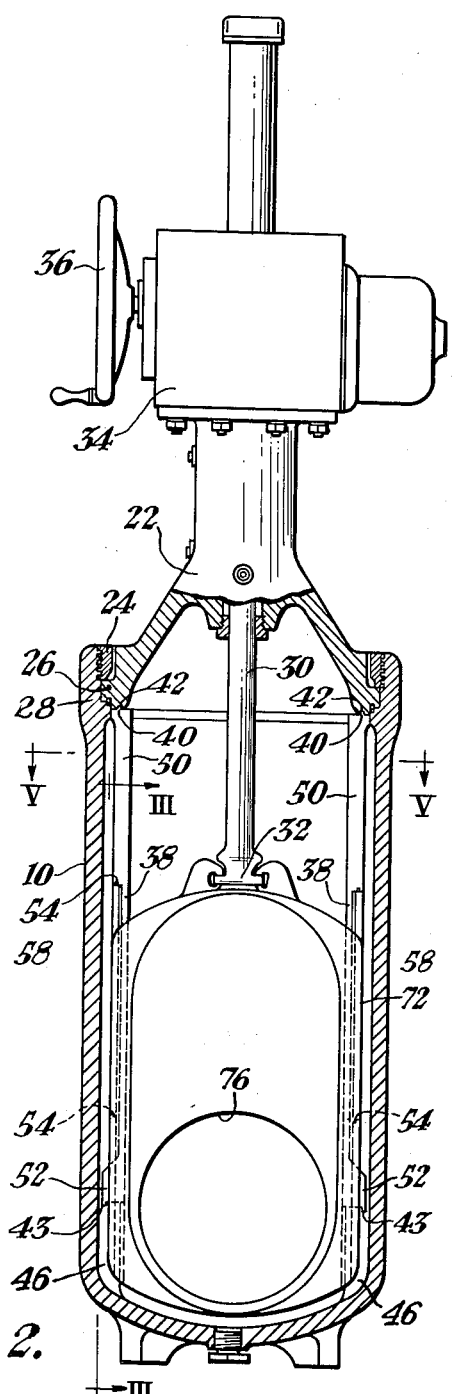
Figure 3:
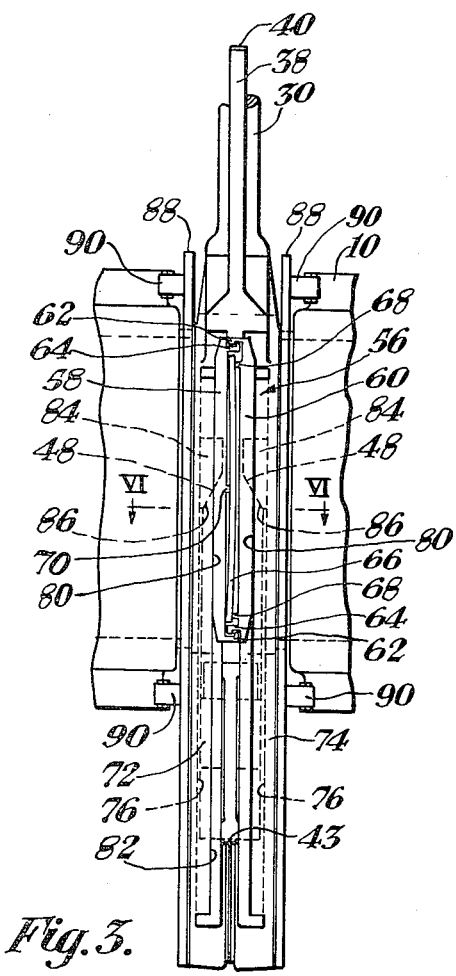
Figure 4:
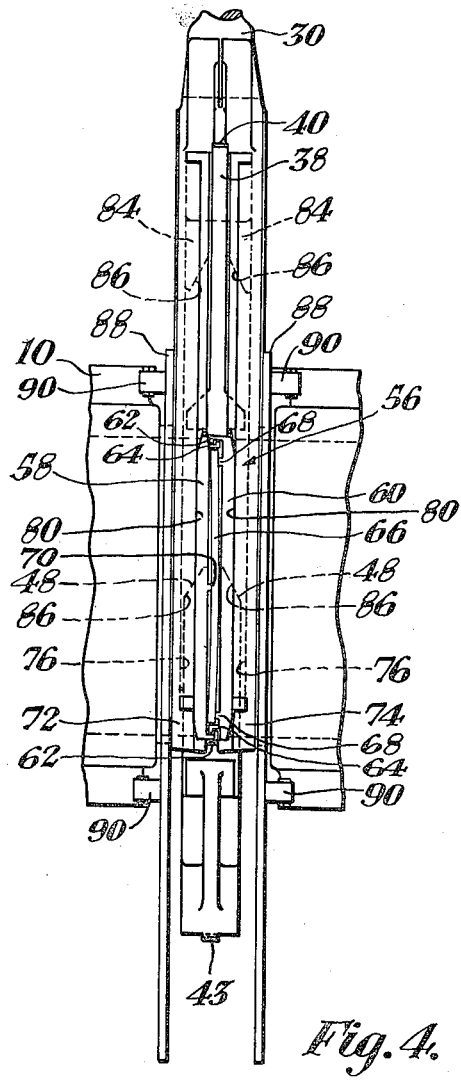
Figure 5:
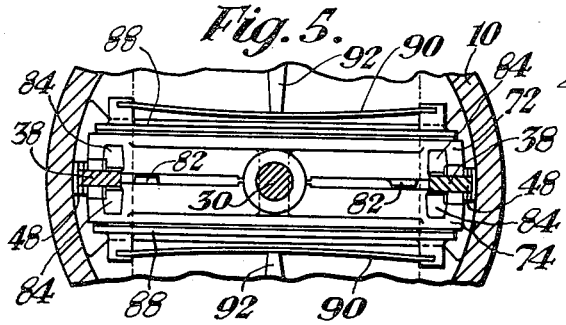
Figure 6:
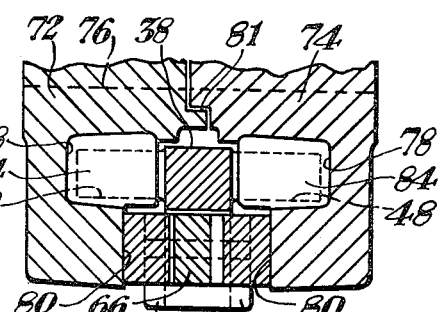
Figure 10:
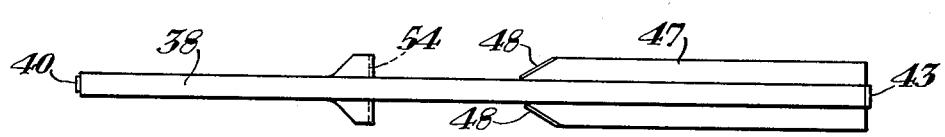
Figure 11:
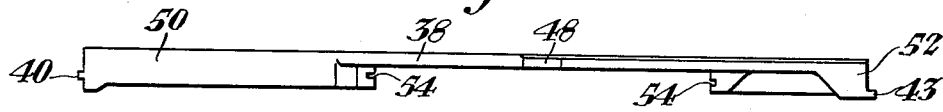
Figure 12:
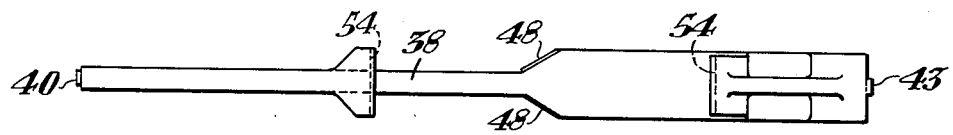
Figure 8:
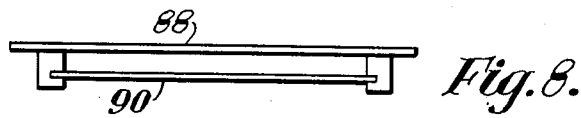
Figures 7, 9:
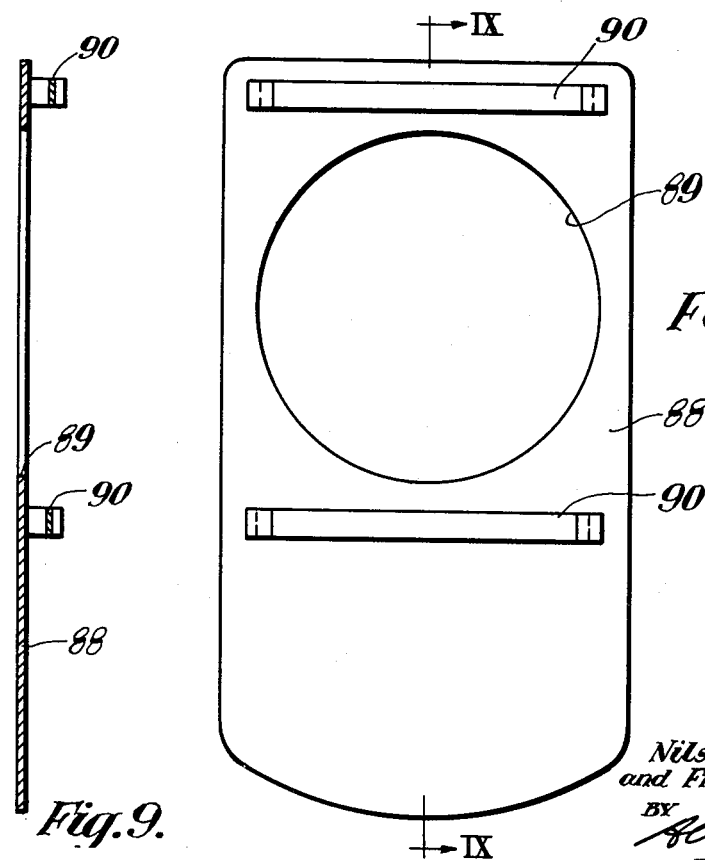

Other objects and advantages will become apparent from the following description taken in connection with the accompanying drawings, wherein:

Fig. 1 is a front elevation, partly in section, of a conduit gate valve embodying this invention, Fig. 2 is a side elevation, partly in section, of the valve shown in Fig. 1, Fig. 3 is a partial section taken on the line III—III of Fig. 2, Fig. 4 is a sectional view, corresponding to Fig. 3, but showing the parts in another position of operation, Fig. 5 is a cross-section on an enlarged scale taken on the line V—V of Fig. 2, Fig. 6 is a partial cross-section on an enlarged scale taken on the line VI—VI of Fig. 3, Fig. 7 is a front elevation on an enlarged scale of one of the shield elements of this invention, Fig. 8 is a plan view of the element shown in Fig. 7, Fig. 9 is a longitudinal sectional view taken on the line IX—IX of Fig. 7, Fig. 10 is a front elevation on an enlarged scale of one of the guide members of this invention, Fig. 11 is a side elevation of the member shown in Fig. 10, Fig. 12 is a rear elevation of the guide member shown in Fig. 10.

Referring more particularly to Figs. 1 and 2 of the drawings, the conduit gate valve is shown as comprising a valve body 10 having a fluid passageway 12 therethrough terminating at opposite ends in inlet and outlet passages 14 and 16 respectively. It will be understood that in accordance with the principles of this invention the inlet and outlet passages 14 and 16 may be reversed if desired. The fluid passageway 12 is intersected by the usual valve chamber having a pair of oppositely disposed parallel seating means provided by threaded seat rings 18 which extend into the valve chamber. A lower chamber 20 is formed on the valve body 10 beyond the seating means and the usual bonnet 22 projects from the side of the body 10 opposite the chamber 20. The bonnet 22 is shown as secured to the body 10 by a pressure seal arrangement including a threaded ring member 24 which serves to secure cooperating flanges 26 and 28 formed on the bonnet and body respectively in sealing engagement.

The gate valve of this embodiment is of the rising stem type and is provided with a valve stem 30 which is journaled for axial movement in the bonnet 22 and provided with the usual stem collar 32 at its inner end. The valve may be adapted for power operation by the provision of a power unit 34 which is mounted on the bonnet 22 and suitably geared to the valve stem 30. A hand wheel 36 may be incorporated in the power unit 34 for manual operation of the valve when desired. As the structure of the power unit forms no part of the present invention further description is deemed unnecessary.

As shown more clearly in assembled relation in Fig. 2 a pair of guide members 38 are mounted on opposite sides of the valve body 10 intermediate the seat rings 18. These guide members 38 are identical in all respects and one is shown in detail in Figs. 10 to 12 inclusive. Thus, each guide 38 includes a projection 40 at one end which engages a suitable recess 42 formed in the bonnet 22 adjacent the flange 26. The opposite end of the guide member 38 is also provided with a projection 43 which engages a suitable recess formed on a lug 46 projecting from the wall of the chamber 20 for this purpose. It should be observed that the terminal ends of each guide member 38 carrying the lugs 40 and 43 are formed to engage the adjacent walls of the bonnet 22 and the lugs 46 respectively to provide firm seating for each guide member 38 and that the projections 40 and 43 are depended upon merely for locating purposes. Due to the construction shown and described, the guide members 38 are mounted permanently in the body 10 although removal can be effected when desired by first removing the bonnet 22 as will be apparent.

Each guide member 38 is provided with an enlargement 47 extending from the end having the projection 43 thereon to the median portion of the guide member 38. The enlargement 47 is provided with oppositely disposed inclined surfaces 48 which together provide wedging means located axially of the fluid passageway 12 in the valve body 10. The inclined surfaces 48 may be suitably surfaced with hard material such as Stellite to increase the wearing qualities. The guide members 38 as shown in Fig. 11 are further provided with thickened sections adjacent each end, one such thickened section 50 being adjacent the projection 40 and the other thickened section 52 being adjacent the projection 43. Oppositely disposed slots 54 are provided in the thickened sections 50, 52 for the reception of one of a pair of expansible spreader means, designated generally by the reference numeral 56, and shown more clearly in Figs. 3 and 4.

The expansible spreader means 56 each comprise a pair of interlocking bar members 58 and 60 which are slidable within the slots 54 in the guide members 38 and are thereby secured in position thereon. Any suitable means for interlocking the bar members 58, 60 together may be employed and, in this embodiment, the bars 58, 60 are provided at each end with L-shaped flanges 62, 64 respectively for this purpose. The bars 58, 60 house between them a bar spring member 66 to provide the expansible feature. A pair of spaced lugs 68 on the bar 60 engages one side of the bar spring 66 while a single lug 70 formed intermediate the ends of the bar 58 engages the bar spring 66 on the opposite side thereof. It will be apparent that the bar spring element 66 so disposed within the bar elements 58, 60 serves to bias these members apart and such movement is limited by the interlocking means 62, 64 formed on the bar elements 58, 60.

The valve closure means for the inlet and outlet passageways 14 and 16 of the fluid passageway 12 comprises a pair of matching valve discs 72, 74 respectively which are of generally rectangular form. In the closed position of the valve, the valve discs 72, 74 extend beyond the seat rings 18 and have aligned ports 76 formed in the extended portion which is housed within the chamber 20. In the open position of the valve, the ports 76 are aligned with the fluid passageway 12 in the body 10 and form a continuation thereof to permit unobstructed passage of fluid through the valve. The upper ends of the valve discs 72, 74 are detachably secured to the valve stem 30 by engagement of suitable slots therein with the collar 32.

The outer faces of the valve discs 72, 74 are substantially parallel for engagement with the seat rings 18 in the closed position. Viewed as a unit the valve discs 72, 74 have longitudinal slots 78 on the inner matching faces which extend on diametrically opposite sides of the seat rings 18 when the valve discs are in position in the body 10. As shown in Fig. 6 the longitudinal slots 78 form a T-shaped opening in cross-section, on either side of the valve discs 72, 74. The head portion of each T-shaped slot 78 accommodates the guide member 38 while the center leg portion accommodates the expansible spreader means 56. As shown more clearly in Figs. 3 and 4, the bar portions 58, 60 of the expansible spreader means 56 engage with the side walls 80 of the leg portion of the T-shaped slots 78 and cooperate therewith for maintaining the valve discs 72, 74 in yieldable engagement with the seat rings 18 in all positions of the valve.

Since the expansible spreader means 56 tends to separate the valve discs 72, 74, means are employed to limit such separation and prevent entrance of line fluid between the valve discs. To this end, a tongue-and-groove joint 81 is formed between the matching faces of the valve discs 72, 74 to lock these members together. Suitable disc-shaped lugs 82, as shown in Fig. 5, may be formed on the matching faces of the valve discs 72, 74 to provide spot contact surfaces between these members. Formed within the head portion of the slots 78 are projections 84 having inclined faces 86 for engagement with the inclined faces 48 formed on the guide members 38. Such cooperation between the wedging means on the valve discs 72, 74 and the wedging means 48 formed on the guide member 38 serves to move the valve discs 72, 74 laterally into seating engagement with the seat rings 18 when the valve member is in closed position. This engagement is illustrated in Fig. 3 where the valve discs 72, 74 are shown in the valve closed position.

A pair of shielding means, comprising generally rectangular plate members 88, are provided for operative engagement with the valve discs 72, 74 respectively. The shield plates 88 are shown more clearly in Figs. 7 to 9 inclusive and are each provided with an aperture 89 for the reception of the projecting ends of the seat rings 18. A yieldable mounting for each of the shield plates 88 comprises a pair of bar springs 90 secured on diametrically opposite sides of the aperture 89 for operative engagement with projections 92 of the valve body 10 located on diametrically opposite sides of the passages 14 and 16 therein. It will be observed that the shield plates 88 extend over the lower ported portion 76 of the valve discs 72, 74 in both the open and closed positions thereof for a purpose apparent hereinafter. As will be apparent from Fig. 5, the engagement of the projections 92 with the bar springs 90 tends to produce a curvature on the springs but the magnitude of the bias exerted thereby is preferably less than that exerted by the bar spring 66 embodied in the expansible spreader means 56.

*Operation*

The valve may be assumed to be in the closed position, shown in Figs. 1 and 3, wherein it will be observed that the inclined faces 86 formed on the valve discs 72, 74 have been brought into engagement with the inclined faces 48 formed on the guide means 38. The wedging action so exerted is axially of the seat rings 18 and the passages 14 and 16, so that the closure areas of the discs 72, 74 are relieved from the wedging action forces and the total force effect upon such areas is thereby lessened. Moreover, the source of wedging action is in the guide members 38 which are permanently located in a position to remove such wedging action forces from the closure areas of the discs 72, 74.

In addition to the wedging action forces there is incorporated in the guide members 38 sufficient stationary and permanent forces to press the valve discs 72, 74 against the seat rings 18 thereby insuring full disc-to-seat ring contact at all times and in all positions of the valve including the closed position shown in Figs. 1 and 3. Such permanent spring force is exerted by the expansible spreader means 56 which remains stationary while the valve discs 72, 74 move between open and closed positions. Moreover, the disc and seat ring contact areas are protected by the shields 88 which project beyond the seat ring contact area and are held against the valve discs 72, 74 by the stationary and permanent forces exerted by the bar springs 90. Since the shields extend over the ported area 76 of the valve discs 72, 74 when the valve is in the closed position shown, then sediment in the disc port opening 76 cannot be discharged into the chamber 20 at any time. Moreover, the force exerted by the bar springs 90 on the shield members 88 need only be sufficient to protect the disc and seat ring contact surfaces against deposits of foreign matter.

Upon rotation of the valve stem 30, either by operation of the power unit 34 or the hand wheel 36, the valve stem 30 moves axially carrying with it the valve discs 72, 74. The valve is thus operated to the open position, shown in Fig. 4, wherein it will be observed that the guide members 38 and the expansible spreader means 56 have remained in permanently located position and have not traveled with the valve discs 72, 74 during such operation. Consequently, the initial movement of the valve discs 72, 74 serves to separate the inclined faces 86 on the valve discs from the inclined faces 48 on the guide members 38 and the only force tending to spread the valve discs 72, 74 apart is that applied by the expansible spreader means 56. There is thus no possibility of any wedging action on the valve discs 72, 74 now that the valve has been operated from its closed position. As previously indicated, the only application of wedging action on the valve discs 72, 74 occurs in the closing direction of the valve.

When the valve discs 72, 74 reach the fully opened valve position, the ports 76 therein are aligned with the passages 14, 16 and form a continuation of the fluid passageway 12 through the valve body 10. The valve discs 72, 74 remain in contact with the seat rings 18 throughout the opening movement due to operation of the expansible spreader means 56 tending to spread the discs apart. Moreover, the shield plates 88 also remain in operative engagement with the valve discs 72, 74 throughout the opening movement due to the bias of the bar springs 90 thereon. However, as in the case of the closing operation, such forces acting upon the shield plates 88 are of lesser magnitude than the forces pressing the valve discs 72, 74 against the seat rings 18 and are only sufficient to protect the discs and seat rings contact surfaces against deposits of foreign matter as previously described.

It will be apparent that while a complete combination of parts for a conduit gate valve have been described and shown in this embodiment of the invention, various features may be independently employed if so desired. Moreover, many changes may be made in details of construction and arrangement of parts without departing from the scope of this invention as defined in the appended claims.

We claim:

1. A conduit gate valve, comprising a casing having inlet and outlet passages and oppositely disposed seating means between said passages, a pair of guide members mounted on opposite sides of said casing intermediate said seating means, expansible spreader means carried by each of said guide members, wedging means carried by each of said guide members, closure means movable between open and closed positions relative to said seating means and said guide members including a pair of matching valve discs having ports forming a continuation of said passages in said open position, wedging means carried by each of said valve discs for cooperation with said wedging means respectively on said guide members in said closed position for applying lateral forces to said valve discs for holding the same in seating engagement with said seating members, and means on said valve discs cooperable with said spreader means for maintaining said valve discs in yieldable engagement with said seating means in all positions thereof.

2. A conduit gate valve as claimed in claim 1 wherein said expansible spreader means comprise interlocking bar members and a spring element therebetween for biasing said members apart.

3. A conduit gate valve, comprising a casing having inlet and outlet passages and oppositely disposed seating means between said passages, a pair of guide members mounted on opposite sides of said casing intermediate said seating means, expansible spreader means carried by each of said guide members and located opposite said seating means, wedging means carried by each of said guide members, closure means movable between open and closed positions relative to said seating means and said guide members including a pair of matching valve discs extending beyond said seating means and having ports forming a continuation of said passages in said open position, wedging means carried by each of said valve discs for cooperation with said wedging means respectively on said guide members in said closed position for applying lateral forces to said valve discs for holding the same in seating engagement with said seating means, and means extending longitudinally of said valve discs beyond said seating means and cooperable with said spreader means for maintaining said valve discs in yieldable engagement with said seating means in all positions thereof.

4. A conduit gate valve as claimed in claim 3 wherein said expansible spreader means comprise interlocking bar members and a spring element therebetween for biasing said members apart, said longitudinally extending means comprising oppositely disposed rib elements formed on the matching surfaces of said valve discs for slidable engagement with said spreader means during movement of said closure means between said open and closed positions.

5. A conduit gate valve, comprising a casing having inlet and outlet passages and oppositely disposed parallel seating means, said casing having a chamber beyond said seating means, a pair of guide members mounted on opposite sides of said casing intermediate said seating means, wedging means carried by each of said guide members, closure means movable between open and closed positions relative to said seating means and said guide members, said closure means including a pair of matching valve discs having lower ported portions housed within said chamber in said closed position and forming a continuation of said passages in said open position, wedging means carried by each of said valve discs for cooperation with said wedging means respectively on said guide members in said closed position for applying lateral forces to said valve discs for holding the same in seating engagement with said seating means, shielding means yieldably mounted on said casing for operative engagement with said valve discs and extending over said lower ported portions thereof in at least said closed position of said closure means, and yieldable means carried by said guide means and operatively engageable with said valve discs for biasing said valve discs into engagement with said seating means respectively, said valve discs being slidable relative to said yieldable means, said yieldable means exerting a force of greater magnitude on said discs than the force exerted thereon by said shielding means.

6. A conduit gate valve as claimed in claim 5 wherein said shielding means extend beyond the lowest position of said ported portions for preventing discharge of sediment therefrom into said chamber.

7. A conduit gate valve, comprising a casing having inlet and outlet passages and oppositely disposed parallel seating means, said casing having a chamber beyond said seating means, a pair of guide members mounted on opposite sides of said casing intermediate said seating means and extending from said chamber to beyond said seating means, expansible spreader means carried by each of said guide members and located opposite said seating means, wedging means carried by each of said guide members, closure means movable between open and closed positions relative to said seating means and said guide members, said closure means including a pair of matching valve discs having lower ported portions housed within said chamber in said closed position and forming a continuation of said passages in said open position, wedging means carried by each of said valve discs for cooperation with said wedging means respectively on said guide members in said closed position for applying lateral forces to said valve discs for holding the same in seating engagement with said seating means, means extending longitudinally of said valve discs to said lower ported portions thereof and cooperable with said spreader means for maintaining said valve discs in yieldable engagement with said seating means in all positions thereof, and shielding means yieldably mounted on said casing for operative engagement with said valve discs and extending over said lower ported portions thereof in at least said closed position of said closure means, said yieldably mounted shielding means acting upon said valve discs in opposition to said expansible spreader means and exerting forces of lesser magnitude on said valve discs than the forces exerted thereon by said expansible spreader means.

References Cited in the file of this patent

UNITED STATES PATENTS

| 2,230,600 | Olson | Feb. 4, 1941 |
| 2,504,924 | Fennema | Apr. 19, 1950 |
| 2,570,413 | Volpin | Oct. 9, 1951 |

FOREIGN PATENTS

| 21,939 | Great Britain | 1911 |
| 198,573 | Great Britain | 1923 |